United States Patent [19]

Harwath

[11] Patent Number: 4,858,884
[45] Date of Patent: Aug. 22, 1989

[54] DIAPHRAGM-ACTUATED VALVE FOR A GEAR PUMP

[75] Inventor: Frank L. Harwath, Rockford, Ill.

[73] Assignee: Suntex Industries Incorporated, Rockford, Ill.

[21] Appl. No.: 247,668

[22] Filed: Sep. 22, 1988

[51] Int. Cl.$^4$ .................... F16K 31/126; F16K 43/00
[52] U.S. Cl. .................... 251/61.4; 251/357; 137/315
[58] Field of Search .................... 137/315, 87, 117; 251/61.3, 61.4, 357

[56] References Cited

U.S. PATENT DOCUMENTS

| | | | |
|---|---|---|---|
| 2,920,861 | 1/1960 | Hartmann | 251/357 |
| 3,511,475 | 5/1970 | Pfau | 251/357 |
| 3,566,901 | 3/1971 | Swedberg | 137/117 |
| 3,905,689 | 9/1975 | Mylander | 251/357 |
| 4,172,585 | 10/1979 | Rolfe | 251/357 |

Primary Examiner—George L. Walton
Attorney, Agent, or Firm—Leydig, Voit & Mayer

[57] ABSTRACT

A gear pump includes a diaphragm-operated valve having a valve member adapted to close a control port. The valve member comprises a generally cupshaped housing, an elastomeric disc telescoped into the housing, and a sheet metal retainer plate which is pressed into the housing to hold the elastomeric disc therein. The retainer plate is formed with angularly spaced and radially projecting tabs which engage the housing to establish a tight fit between the plate and the housing. The retainer plate is formed by fine blanking a sheet of metal and, as a result of the fine blanking operation, axially projecting burrs are formed on the tabs. To prevent the burrs from piercing the diaphragm, a circumferentially extending relief groove is formed in the periphery of the retainer adjacent the tabs and results in the burrs being kept in spaced relation with the diaphragm.

4 Claims, 1 Drawing Sheet

DIAPHRAGM-ACTUATED VALVE FOR A GEAR PUMP

BACKGROUND OF THE INVENTION

This invention relates to a valve member for a valve assembly. While the valve member lends itself to various applications, it is particularly useful in connection with a valve assembly for a gear pump of the type disclosed in Swedberg U.S. Pat. No. 3,556,901. The gear pump of the Swedberg patent is especially designed to supply fuel to an oil burner.

A pump of the type disclosed in the Swedberg patent includes a diaphragm-operated valve assembly which controls opening and closing of the main regulating valve for controlling the supply of fuel from the pump to the oil burner. Such a valve assembly includes a valve member adapted to open and close a control port. A Belleville spring engages one side of the valve member and urges the latter to an open position with respect to the control port. The other side of the valve member engages a flexible diaphragm which is responsive to the output pressure of the pump. When that pressure exceeds a predetermined magnitude, the diaphragm causes the valve member to close the control port and effect opening of the main regulating valve. When the pump is shut down, the Belleville spring snaps the valve member to a position opening the control port and effecting rapid closure of the regulating valve.

A valve member for a valve assembly of the above type consists of three components, namely, a cup-shaped housing, an elastomeric valve disc telescoped into the housing, and a retainer for holding the valve disc in the housing. The retainer is in the form of a plate having angularly spaced and radially projecting tabs which engage the inside of the housing with a tight fit. Conventionally, the retainer is stamped from sheet metal and the tabs are left with burrs which must be removed in order to prevent puncturing of the flexible diaphragm. Also, the stamping process significantly reduces the thickness of the tabs. As a result, the retention ability of the tabs is reduced.

SUMMARY OF THE INVENTION

The primary aim of the present invention is to provide a new and improved valve member of the above type in which the need for removing burrs from the tabs of the retainer is completely eliminated. Moreover, the retainer engages the housing of the valve member with a tighter fit than has been possible heretofore.

A more detailed object of the invention is to achieve the foregoing by fine blanking the retainer from sheet metal and by creating relief areas adjacent the tabs during the blanking operation so as to prevent burrs from projecting beyond the retainer and puncturing the diaphragm.

Another object of the invention is to avoid a significant reduction in the thickness of the tabs of the retainer during the blanking operation and thereby enable the tabs to tightly engage the housing of the valve member.

These and other objects and advantages of the invention will become more apparent from the following detailed description when taken in conjunction with the accompanying drawings.

DETAILED DESCRIPTION OF THE PREFERRED EMBODIMENT

Figure 1:
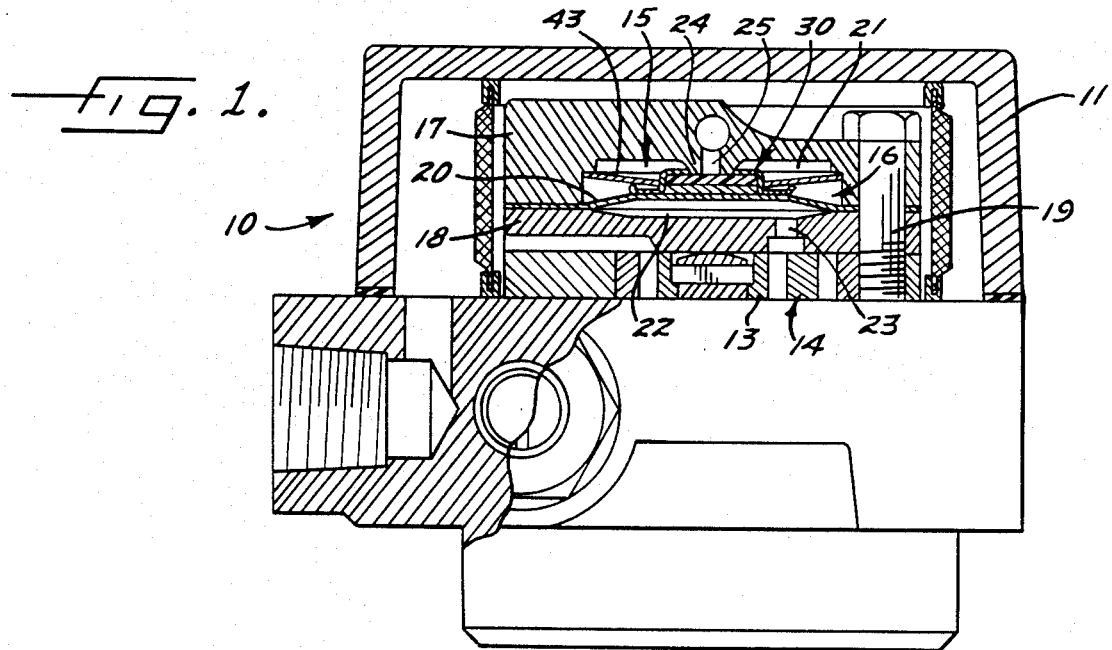
FIG. 1 is a side elevational view of a typical gear pump equipped with a new and improved valve member incorporating the unique features of the present invention, certain parts of the pump being broken away and shown in section.

For purposes of illustration, the invention has been shown in the drawings as being embodied in a pump 10 and specifically in a gear pump for supplying fuel to an oil burner. The physical construction and the hydraulic circuitry of the pump are generally the same as disclosed in Swedberg U.S. Pat. No. 3,566,901.

The pump 10 as such does not form part of the present invention and shall be described only briefly. In general, the pump includes a housing 11 which rotatably supports a power driven shaft 12. The shaft serves to rotate the pinion 13 of a gear set 14. When the pinion is rotated, fuel oil is drawn from a tank, is pressurized and is supplied to an oil burner. The supply of fuel to the burner is controlled by a main regulating valve (not shown) which opens automatically when the pump output pressure exceeds a predetermined value and closes when the output pressure falls below that value.

Opening and closing of the regulator valve is controlled by a diaphragm-operated valve assembly 15 which is located in the housing 11. More specifically, the valve assembly is located in a chamber 16 defined between two housing members 17 and 18 which are secured together by screws 19. A flexible diaphragm 20 is clamped between the housing members 17 and 18 and divides the chamber into upper and lower compartments 21 and 22. In the present instance, the diaphragm is made of suitable fabric such as Teflon-coated nylon having a thickness of approximately 0.030".

The lower compartment 22 receives fuel at substantially the same pressure as the output of the gear set 14, such fuel being supplied to the lower compartment via a passage 23 in the housing member 18. Formed integrally with the upper housing member 17 and projecting into the upper compartment 16 is a valve seat 24 having a control port 25 which communicates with the upper compartment. When the port 25 is closed, pressurized fuel from the gear set 14 is utilized to open the main regulating valve and enable fuel to flow to the oil burner. Upon opening of the port, pressurized fuel from the gear set is returned directly to the tank and bypasses the regulator valve so as to enable the latter to close. The aforementioned Swedberg patent contains a more detailed disclosure of the operation of a valve assembly of the same general type as the present valve assembly 15.

To close the port 25, the valve assembly 15 includes a valve member 30 (FIG. 2) adapted to be shifted upwardly and downwardly in the chamber 16. Herein, the valve member includes a housing 31 made of sheet metal and having a substantially planar top wall 32 with an axially extending hole 33 formed therethrough. The housing 31 is generally circular in cross-section and includes an annular skirt 34 which is formed integrally with and depends from the outer periphery of the top wall 32.

Figure 2:
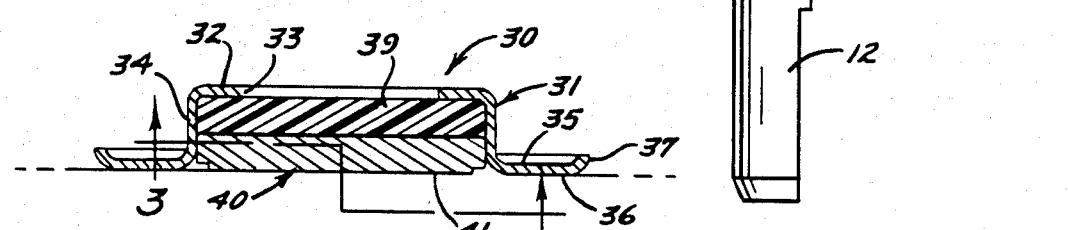
FIG. 2 is an enlarged cross-section taken axially through the valve member of the pump shown in FIG. 1.
Figure 3:
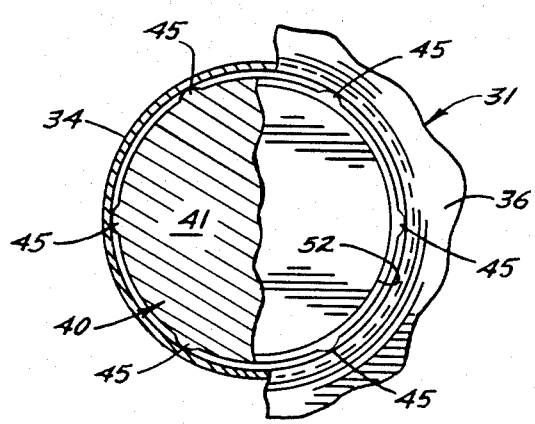
FIG. 3 is a fragmentary cross-section taken substantially along the line 3—3 of FIG. 2.

Formed integrally with and depending from the lower margin of the skirt 34 is a radially projecting flange 35 (FIG. 2). The lower face 36 of the flange is substantially flat and planar. An upturned rim or lip 37 is formed integrally with the outer margin of the flange.

Telescoped into the valve member housing 31 is a valve disc 39 (FIG. 2) made of a suitable elastomeric material such as that sold under the trade designation "VITRON". The disc is circular and its upper side abuts the lower side of the top wall 32. When the valve member 30 is closed, the disc 39 engages the valve seat 24 by way of the hole 33 and seals the port 25.

The valve member 30 is completed by a retainer 40 in the form of a circular plate made of sheet metal. The retainer plate 40 is telescoped tightly into the housing 31 and its lower face 41 is disposed in the same plane as the lower face 36 of the flange 35.

The flat lower faces 36 and 41 of the flange 35 and the retainer plate 40, respectively, engage the upper side of the diaphragm 20. A Belleville spring 43 (FIG. 1) is located in the upper compartment 21 and bears downwardly on the lip 37 of the flange 35 so as to bias the valve member 30 to its open position with respect to the port 25. When pressurized fuel is admitted into the lower compartment 22, the valve member 30 is moved closed against the bias of the spring 43.

According to the present invention, the retainer plate 40 is formed with tabs 45 which engage the housing 31 and hold the retainer plate in the housing without any danger of burrs on the tabs puncturing the diaphragm 20. Moreover, the tabs 45 are comparatively thick and engage the housing with a tight fit so as to hold the retainer plate 40 securely in the housing 31.

Figure 4:
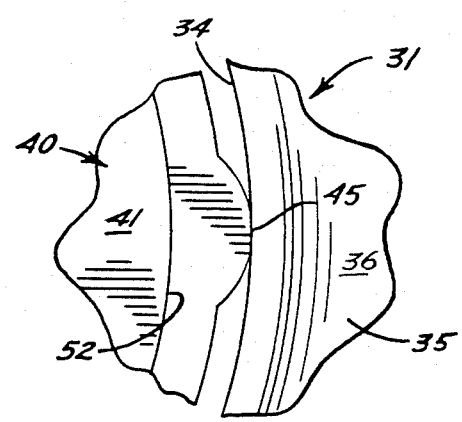
FIG. 4 is an enlarged fragmentary plan view showing part of the retainer and the housing of the valve member.

In the present instance, the retainer plate 40 is formed with six tabs 45, the tabs being spaced equally around the periphery of the retainer and projecting radially outwardly from the periphery. The edge of each tab is arcuate as is apparent from FIG. 4. When the retainer 40 is telescoped into the housing 31, the edges of the tabs 45 engage the inside of the skirt 34 of the housing and hold the retainer in place. During such telescoping, the tabs and the skirt deform ever so slightly so as to establish an interference fit.

The retainer 40 is formed by a fine blanking process, i.e., a blanking process in which the lower face 41 of the retainer is supported and backed by a bottom punch when a sheet of metal is stamped by a pair of coating dies. When the dies close on the sheet metal, the bottom punch forces the retainer upwardly into the upper die.

When the retainer 40 is blanked, burrs 50 (FIG. 5) are formed on the tabs 45 and extend in the direction of punching. Pursuant to the invention, a groove or relieved area 52 is formed around the outer periphery of the lower face 41 of the retainer 40 and extends beneath each tab 45 to prevent the burrs 50 from projecting beyond the plane of the lower face 41 of the retainer 40 and puncturing the diaphragm 20. Thus, the lower face of each tab as defined by the groove relief area 52 is disposed in a plane located between the disc 39 and the plane occupied by the lower face 36 of the flange 37 and the lower face 41 of the retainer 40. As a result, the burrs 50 which are formed during the blanking operation do not extend downwardly into the latter plane and are prevented from puncturing the diaphragm 20.

Figure 5:
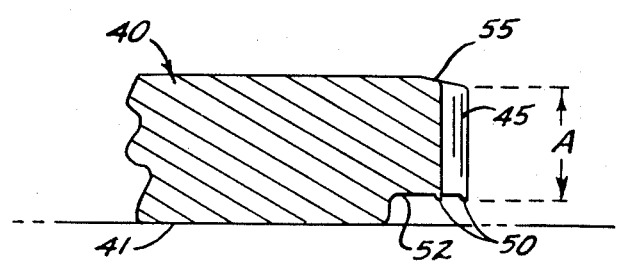
FIG. 5 is an enlarged fragmentary cross-section taken axially through the retainer.

As shown in FIG. 5, the upper side of the retainer 40 slopes downwardly and outwardly adjacent the periphery of the retainer as indicated at 55. This angle is imparted to the surface 55 during the fine blanking process and is significantly smaller than the angle resulting from conventional stamping. As a result, the effective thickness or dimension A of each tab is greater than the corresponding dimension of a tab formed by conventional stamping.

When the retainer 40 is assembled with the housing 31, there is no need to orient the retainer to any right side up position. If the retainer is assembled in the orientation shown, the relieved areas 52 beneath the tabs 45 prevent the burrs 50 from piercing the diaphragm 20. If the retainer is assembled in an inverted orientation, the burrs point opposite of the diaphragm and create no problem. In either case, the relatively thick tabs tightly engage the skirt 34 of the housing 31 to establish a tight fit between the retainer and the housing.

Thus, the retainer 40 of the present invention need not be positioned in any given orientation before assembly with the housing 31. Also, there is no need to tumble the retainers or perform any other burr removing operation on the retainers. The burrs are allowed to remain but are rendered non-destructive by virtue of the relieved areas 52.

I claim:

1. A valve member having a generally cup-shaped housing of circular cross-section, said housing comprising a substantially planar wall having an axially extending hole formed therethrough, an annular skirt formed integrally with and extending axially from the outer periphery of said wall, an annular flange formed integrally with and projecting radially outwardly from said skirt and having a face spaced axially from and disposed substantially parallel to said wall, a disc of elastomeric material telescoped into said housing and having one side located in abutting relation with said wall, a retainer for holding said disc in said housing, said retainer comprising a generally circular plate made of sheet metal and telescoped into said housing in abutting relation with the other side of said disc, said plate having one face disposed in substantially the same plane as said face of said flange, a plurality of angularly spaced and radially outwardly projecting tabs formed integrally with the outer periphery of said plate and engaging the inner side of said skirt with a tightly thereby to hold said retainer in assembled relation with said housing, each of said tabs including a face disposed in non-abutting relation with said disc and disposed in a predetermined plane located between said disc and the plane occupied by said one face of said flange and said one face of said plate thereby to prevent any burrs on said tabs from projecting into the latter plane.

2. A valve member as defined in claim 1 in which a circumferentially extending groove is formed in said one face of said plate adjacent the outer periphery thereof so as to cause the faces of said tabs to lie in said predetermined plane.

3. A valve assembly comprising a valve seat having a port therein, a valve member movable between open and closed positions with respect to said port, a Belleville spring engageable with one side of said valve member and operable to urge said valve member toward said open position, and a flexible and pressure responsive diaphragm engageable with the other side of said valve member and operable to urge said valve member toward said closed position when subjected to pressurized fluid, said valve assembly being characterized in that said valve member includes a generally cup-shaped housing of circular cross-section, said housing comprising a substantially planar wall having a hole formed therethrough in alignment with said port, an annular skirt formed integrally with the outer periphery of said wall and extending axially away from said port, an annular flange formed integrally with and projecting radially outwardly from said skirt and engaging said spring, said flange having a face spaced axially from and disposed substantially parallel to said wall and engaging said diaphragm, a disc of elastomeric material telescoped into said housing and having one side located in abutting relation with said wall so as to seal against said port when said valve member is in said closed position, a retainer for holding said disc in said housing, said retainer comprising a generally circular plate formed of sheet metal and telescoped into said housing in abutting relation with the other side of said disc, said plate having one face disposed in substantially the same plane as said face of said flange and engaging said diaphragm, and a plurality of angularly spaced and radially outwardly projecting tabs formed integrally with the outer periphery of said plate and engaging the inner side of said skirt with tight fit thereby to hold said retainer in assembled relation with said housing, each of said tabs including a face disposed in non-abutting relation with said disc and disposed in a plane located between said disc and the plane occupied by said one face of said flange and said one face of said plate thereby to prevent any burrs on said tabs from projecting into and piercing said diaphragm.

4. A valve assembly as defined in claim 3 in which a circumferentially extending groove is formed in said one face of said plate adjacent the outer periphery thereof so as to cause the faces of said tabs to lie in said predetermined plane.

* * * * *